United States Patent [19]
Fevre et al.

[11] Patent Number: 5,775,172
[45] Date of Patent: Jul. 7, 1998

[54] GUIDING AND ENERGY ABSORPTION DEVICE FOR A MOTOR VEHICLE STEERING COLUMN

[75] Inventors: Laurent Fevre, Saint-Sulpice; Jean-Christophe Bodin, Saint Ouen, both of France

[73] Assignee: Lemforder Nacam S.A., Vendome, France

[21] Appl. No.: 686,673

[22] Filed: Jul. 26, 1996

[30] Foreign Application Priority Data

Jul. 26, 1995 [FR] France ................. 95 09108

[51] Int. Cl.⁶ .................................................. B62D 1/18
[52] U.S. Cl. ........................ 74/492; 188/371; 280/777
[58] Field of Search ........................ 74/492; 188/371; 280/777

[56] References Cited

U.S. PATENT DOCUMENTS

| | | | |
|---|---|---|---|
| 4,786,076 | 11/1988 | Wierschem | 74/492 X |
| 4,943,028 | 7/1990 | Hoffmann et al. | 280/777 X |
| 5,082,311 | 1/1992 | Melotik | 280/777 |

FOREIGN PATENT DOCUMENTS

| | | | |
|---|---|---|---|
| 35 21 644 | 12/1986 | Germany . | |
| 195 08 443 | 9/1995 | Germany . | |
| 63-121568 | 5/1988 | Japan | 280/777 |

Primary Examiner—Allan D. Herrmann
Attorney, Agent, or Firm—Young & Thompson

[57] ABSTRACT

The column comprises a column body (1) mounted on the frame via brackets (5, 6) comprising openings (15, 16) for the passage of fixing elements (12) to the frame, and capsules (10, 11) enclosing the brackets and retained by the fixing elements (12). The openings comprise guiding surfaces (21) disposed two by two on both sides of a vertical plane (31) containing the axis (32) of the column. In the event of an impact occurring, the brackets integral with the column body (1) move with respect to the capsules fixed to the frame, the guiding surfaces (21) sliding into the capsules (10, 11). These movements absorb a portion of the energy due to the impact and the surfaces ensure the axial guiding of the column. The capsules are made of plastics and a metallic insert is inserted between the fixing elements and the capsules. The column is particularly useful for motor vehicles provided with an inflatable safety air bag should an impact occur.

15 Claims, 5 Drawing Sheets

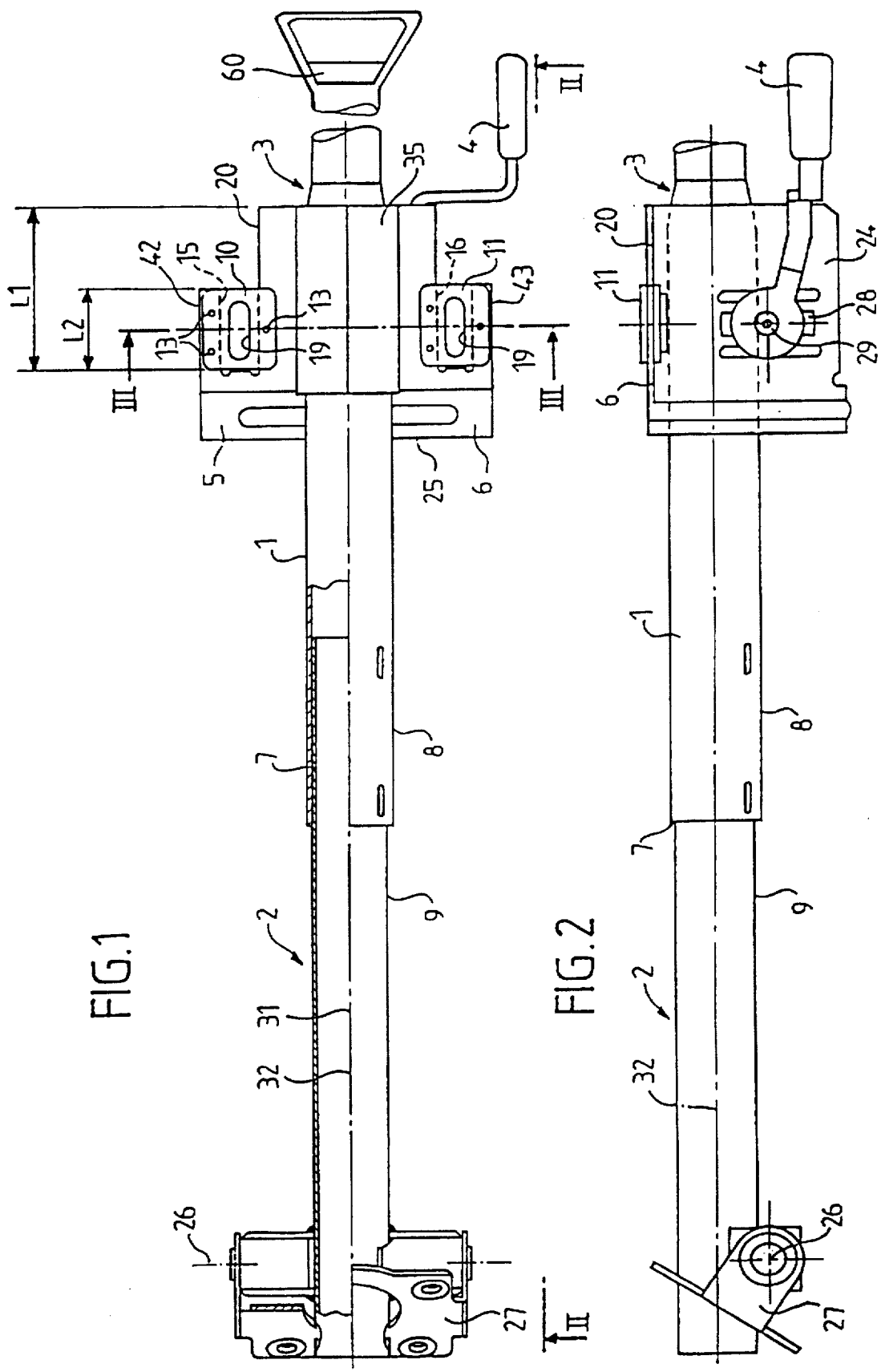

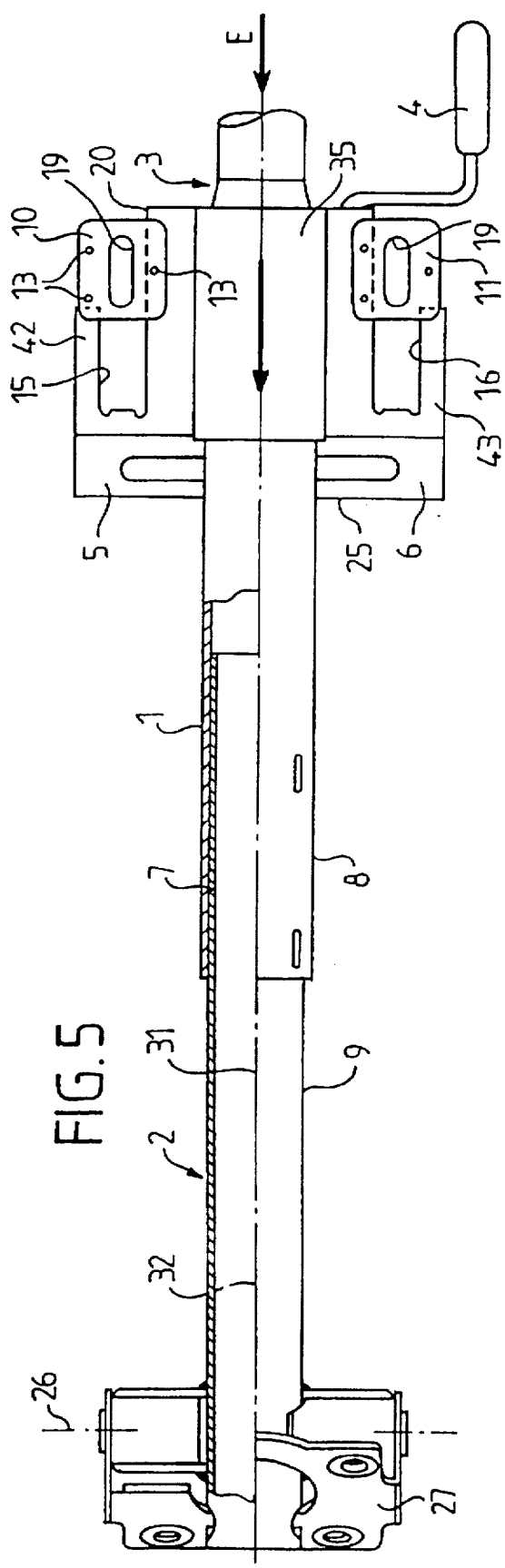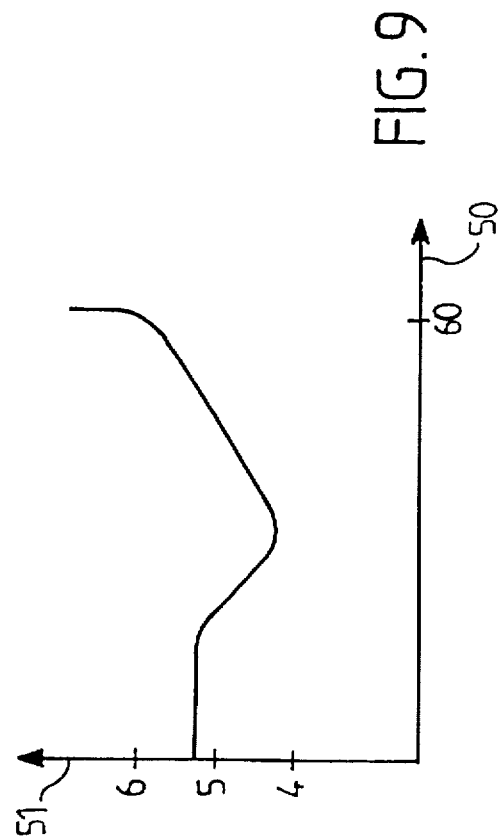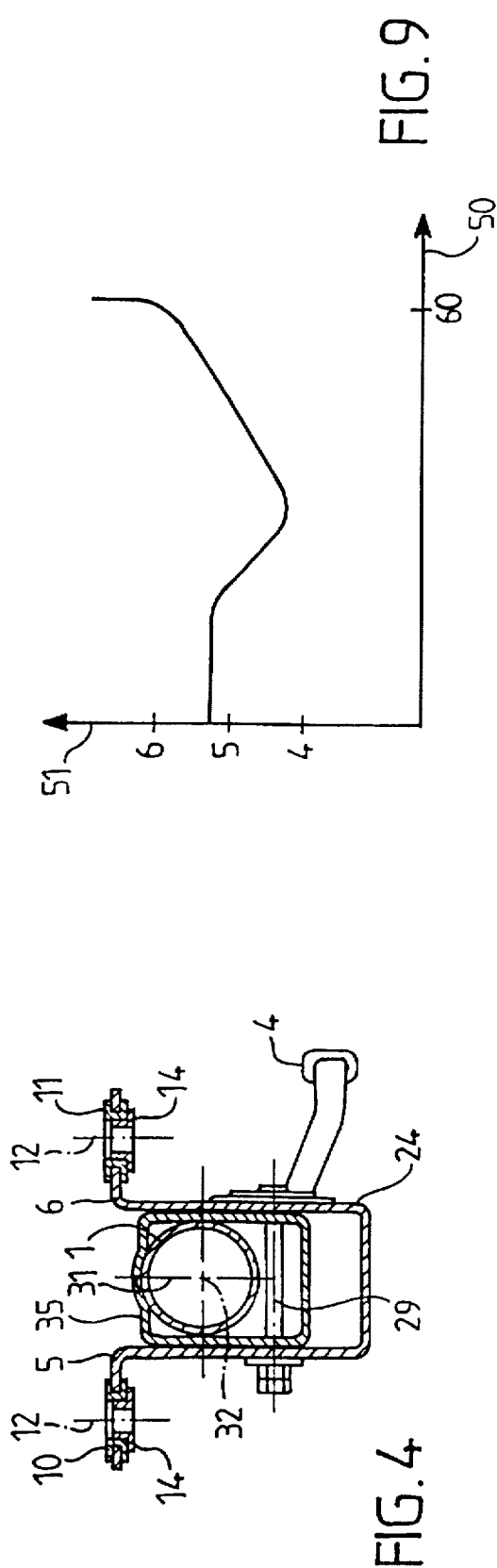

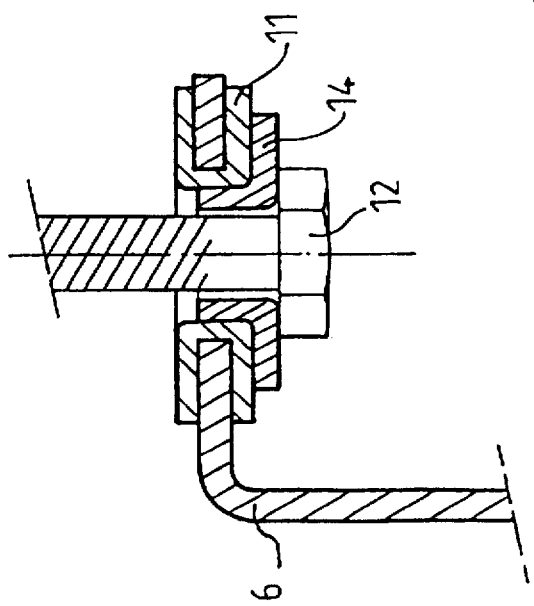
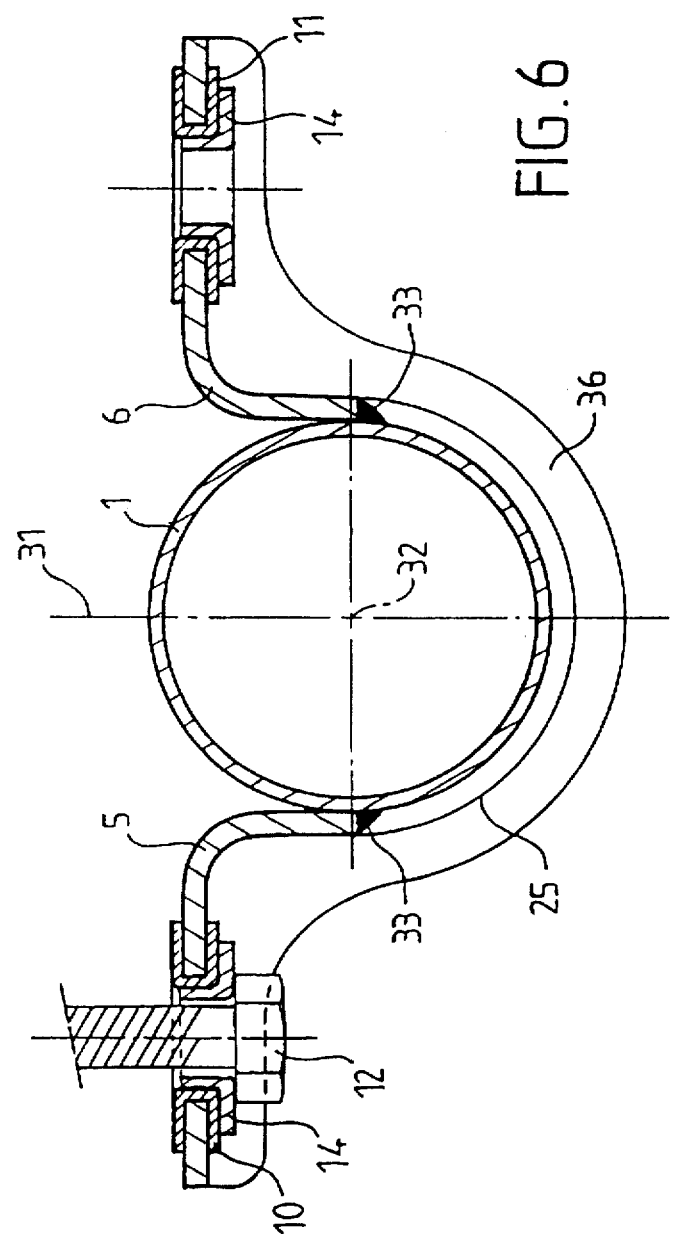

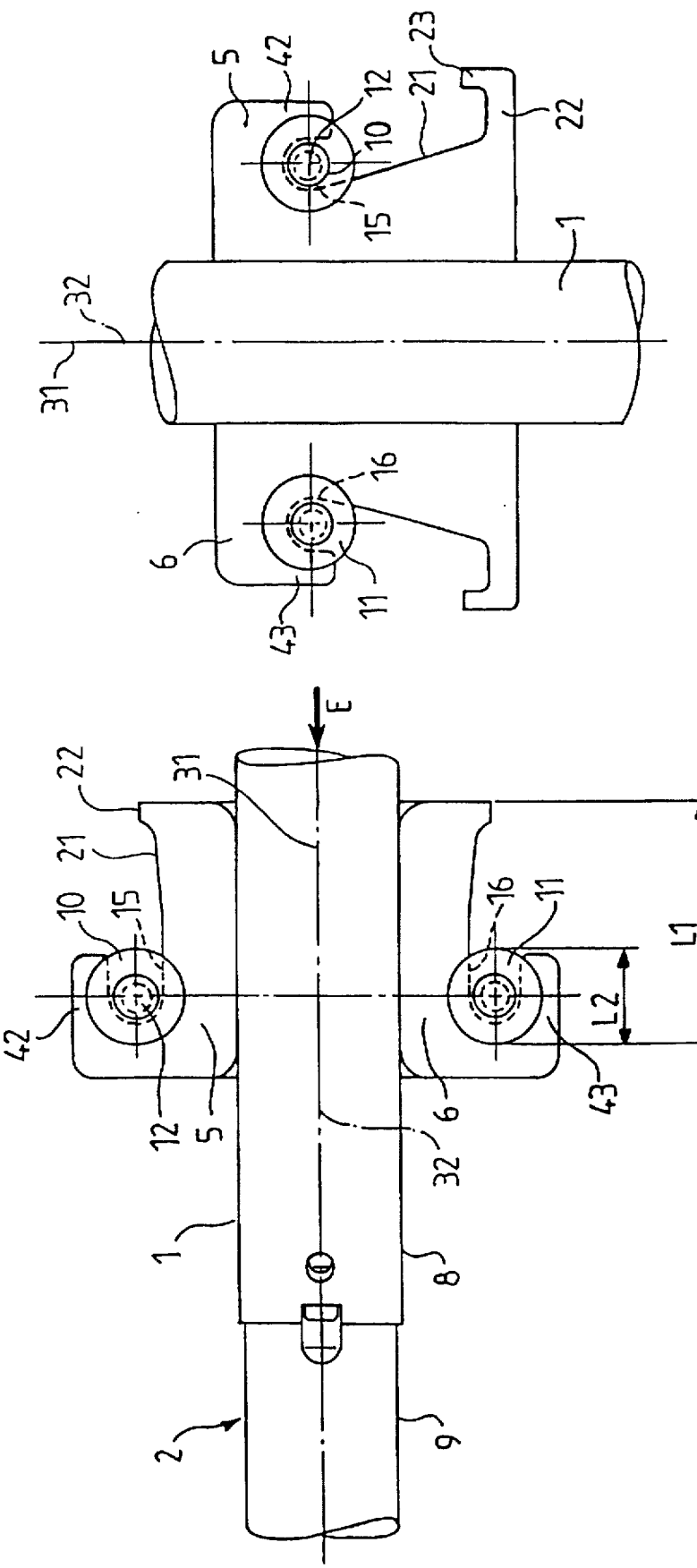

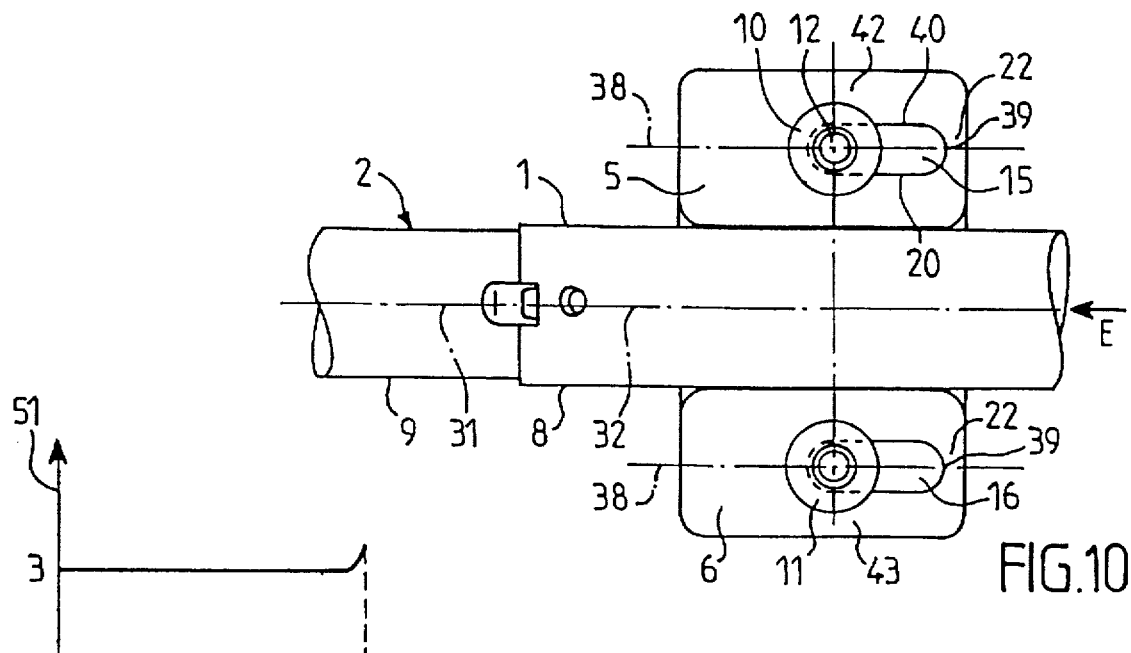
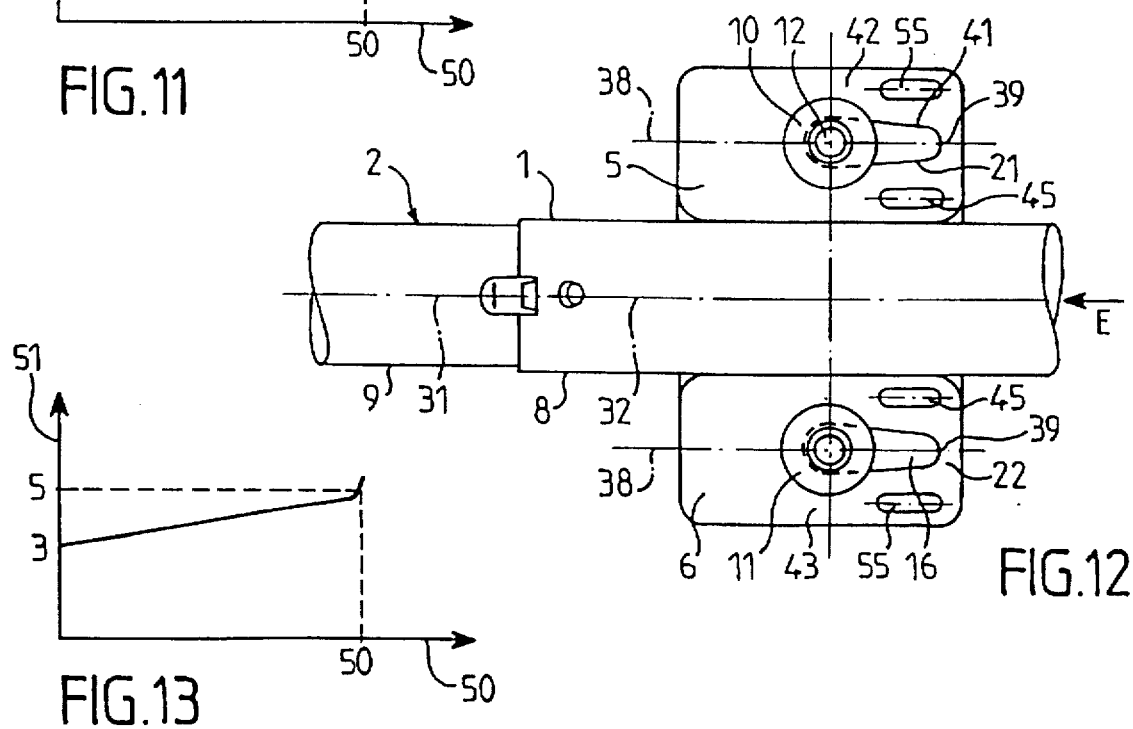
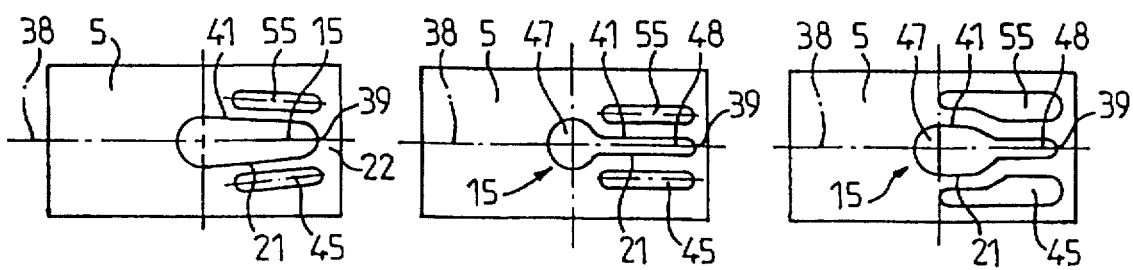

GUIDING AND ENERGY ABSORPTION DEVICE FOR A MOTOR VEHICLE STEERING COLUMN

FIELD OF THE INVENTION

The present invention relates to motor vehicle steering columns and more particularly to such a column equipped with a guiding and energy absorption device in cases of impact.

BACKGROUND OF THE INVENTION

So as to improve the safety of the driver of a car at the time of a frontal collision, the steering columns are fitted with systems adapted to reduce the seriousness of the impact of the driver on the steering wheel.

Accordingly, a large number of devices have been designed to progressively absorb the kinetics energy generated by the impact and generally make use of friction or deformation stresses.

These stresses need to be fully controlled so as to absorb all the energy due to the impact without producing an excessive deceleration of the column with respect to the frame, which, as far as the driver is concerned, could be fatal.

These devices are illustrated in the patents FR-2.668.442, U.S. Pat. No. 3,943,793 and GB-2.268.125 given in the present description solely by way of reference.

The columns generally comprise a column body fixed to the frame by brackets. It has already been proposed to link these brackets to the frame by means of fixing elements and mount capsules cooperating with the brackets so as to absorb a portion of the energy at the time of an impact.

This simple disposition obtains good results. However, it has been observed that, at the time of an impact, the column can be deviated from its axis, which reduces energy absorption efficiency.

This is why the axial guiding of the steering column also needs to be taken into account. This aspect is even more important when an inflatable safety bag is used, currently known as an <<air bag>>. This type of device significantly contributes in reducing the seriousness of the impact by distributing as much as possible the force of the steering wheel on the thorax of the driver, but so as to be fully effective, it needs to be accompanied by the control of the position and movement of the column during the impact.

Known embodiments make use of two separate systems or means:

a first system absorbing the kinetics energy of the driver during the entire movement.

a second system ensuring a guiding of the column.

The document DE-C-35.21.644 describes a safety mounting for a steering column. The safety mounting has a U-shaped support comprising lateral mounting flanges at one extremity. These flanges form a single metallic element with the support and are linked to the structure of the car by means of mounting plates fixed to the frame by wedges. The lateral flanges each include a slot orientated axially and the mounting plates form for each flange a central slide bordered by two lateral grooves, cooperating with the slot of the flange.

The document U.S. Pat. No. 5,082,311 relates to a dismantable steering column assembly for passively absorbing the impact energy. This assembly includes a main support fixed at its base to the body of the steering column, which is provided with lateral members extending parallel to the steering column. A guiding slot is formed in each lateral member and forms two lateral rails, one of the two rails constituting a guiding rail and the other an energy absorption rail. A bolt passing through each guiding slot keeps the support onto the vehicle construction.

OBJECTS OF THE INVENTION

The aim of the present invention is to improve control of the kinetics energy absorption over the travel of the column allowed by guiding by combining the energy absorption means and guiding means in the same device.

An additional aim of the invention is to absorb an energy of between 200 and 600 joules.

Another aim of the invention is also to allow for the simple embodiment and mounting of the column and thus reduce costs.

Another aim of the invention is to provide a device for energy absorption and for guiding a motor vehicle steering column associated with an inflatable bag in cases of impact, said device also ensuring by virtue of the improved guiding of the column a correct positioning of the bag, that is substantially in the axis of the column and at the level of the thorax of the driver.

SUMMARY OF THE INVENTION

The invention therefore relates to a steering column with an energy absorption device for a motor vehicle and comprising a column body mounted on the frame by means of brackets comprising openings for the passage of fixing elements for fixing to the frame, and units or capsules associated with at least some of the brackets and enclosing them, at least partially, the capsules being retained by the fixing elements so that if an impact occurs, the brackets integral with the column move with respect to the capsules fixed to the frame, the relative movement of a bracket with respect to the capsule associated with it having an effect of absorbing the energy due to the impact. The openings of the brackets comprise guiding surfaces which are disposed two by two on both sides of a vertical plane containing the axis of the column and on which the capsules slide if an impact occurs. The lengths of the guiding surfaces are sufficiently large so as to control movement of the column in a guiding direction substantially parallel to the axis of the column.

According to the invention, the capsules are made of plastics and a metallic insert is inserted between the fixing elements and the capsules.

The guiding surfaces are preferably disposed symmetrically two by two with respect to the vertical plane.

The guiding lengths on the brackets may advantageously extend up to 100 mm.

According to a first embodiment, the guiding surfaces are substantially rectilinear and extend in a direction substantially parallel to the vertical plane.

According to one preferred embodiment of the invention, at least some of the guiding surfaces have a variable profile along the axis of the column, making it possible to control cooperation between said surface and the capsule sliding on it. In this embodiment, it is preferable to select the guiding surfaces so that they follow a curve varying monotonously in the direction of the associated opening with a slope of preferably between 10 and 30 degrees. In this case, the further the column moves at the time of an impact with respect to the frame, the more the brackets buckle.

The progressive energy absorption obtained according to the invention is adapted as best as possible so as to reduce the consequences of the impact. The column is also kept over its entire travel between the fixing elements and is perfectly guided.

For reasons of mechanical balancing and symmetry, the various brackets generally have the same structure, although this is not strictly essential.

At least one bracket is preferably equipped with at least one stop consisting of a projecting portion not parallel to the guiding direction, preventing the column from escaping from the holding devices when it arrives at the end of travel. The stop is effectively fitted with a return consisting of a protuberance slanted with respect to the stop and orientated substantially towards the capsule associated with the stop.

At least some of the openings are preferably bordered on both sides with respect to the vertical plane, with internal and external guiding surfaces.

Thus the stresses exerted in the associated brackets are balanced in cases of impact, which makes it possible to minimise the forces applied to the column and frame, transversally to the axis of the column.

It is useful that at least some of the brackets comprise complementary holes disposed along at least one portion of the openings of the brackets. These complementary holes make it possible to improve control of buckling of the brackets at the time of an impact.

In a first embodiment where the column includes a first portion or rear portion situated on the driver side and a second portion or front portion situated towards the front of said vehicle, and rear and front holding devices placed respectively at the rear and front of the column, said guiding and energy absorption device is provided at the level of both the rear and front holding devices.

According to a second embodiment, the device of the invention is installed solely at the level of the rear holding device, a known type of system for the telescopic guiding of the body of the column then being provided at the front so as to allow for movement of the rear portion of the body with respect to the front holding device.

The invention combines the energy absorption and guiding of the column by passively controlling the guiding orientation of the column at the time of an impact whilst accurately adjusting the energy absorption force until the end of the movement.

The force generated by the energy absorption system is preferably between 2,000 and 6,000 N.

The steering column provided with a steering wheel is preferably equipped with an inflatable air bag which is used to distribute the force of the steering wheel over the entire thorax of the driver.

In one embodiment, the column body is fixed to the frame by a known type of reinforcement square disposed in a support, the brackets in this case being integral with this support.

In another embodiment, the body of the column is fixed to the frame by the mounting, known per se, of a tubular element partly matching the body of the column, the brackets in this case being integral with said tubular element.

Advantageously, a height and/or inclination adjustment device, known per se, for the column is adapted to improve driver comfort during normal operation.

The body of the column can then be adjusted with respect to the frame of the vehicle and thus with respect to the brackets.

BRIEF DESCRIPTION OF THE DRAWINGS

There now follows a non-restrictive description by embodiment examples with reference to the accompanying drawings on which:

FIG. 1 is a top view with an axial half-section of a steering column with the energy absorption and guiding device of the invention.

FIG. 2 is an axial side view along the direction II of the steering column shown in FIG. 1.

FIG. 3 is a partial sectional view along III—III of FIG. 1 and showing an enlarged view of a bracket.

FIG. 4 is an sectional view along III—III of FIG. 1.

FIG. 5 is a top view with an axial half-section of the steering column of FIG. 1 during movement of the column at the time of an impact.

FIG. 6 is a sectional view corresponding to FIG. 4 and showing a second embodiment of the support.

FIG. 7 is a partial axial longitudinal view of a steering column with an energy absorption and guiding device corresponding to a second embodiment of the brackets.

FIG. 8 is an axial longitudinal view of the brackets according to a variant of the embodiment of FIG. 7.

FIG. 9 is a diagram representing the force exerted by a capsule on the associated bracket according to the embodiment of FIGS. 7 or 8 and expressed in kN according to their relative movement in mm.

FIG. 10 is a partial axial longitudinal view of a steering column with an energy absorption and guiding device corresponding to a third embodiment of the brackets.

FIG. 11 is a diagram representing the force exerted by a capsule on the associated bracket according to the embodiment of FIG. 10 and expressed in kN according to their relative movement in mm.

FIG. 12 is a partial axial longitudinal view of a steering column with an energy absorption and guiding device corresponding to a fourth embodiment of the brackets.

FIG. 13 is a diagram representing the force exerted by a capsule on the associated capsule according to the embodiment of FIG. 12 and expressed in kN according to their relative movement in mm.

FIG. 14A is an axial longitudinal view of a fifth embodiment of one of the brackets.

FIG. 14B is an axial longitudinal view of a sixth embodiment of one of the brackets.

FIG. 14C is an axial longitudinal view of a seventh embodiment of one of the brackets.

DESCRIPTION OF THE PREFERRED EMBODIMENTS

The same reference numerals on the drawings are used to denote identical elements.

The steering column of a motor vehicle is formed of a body 1 with an axis 32 and including a front portion 2 situated towards the front of the vehicle and a rear portion 3 situated on the side of the driver. This rear portion is intended to receive a steering wheel at its extremity and advantageously an inflatable air bag 60 to distribute the forces due to a possible impact on the driver.

In the embodiments shown in FIGS. 1 to 5, the column is fitted with a rectangular support 24 integral with its rear portion 3 by means of a reinforcement square 35. The support 24 comprises two brackets 5 and 6 connected to the frame (not shown) of the vehicle. It also includes a telescopic system 7 in its front portion rendering possible the axial sliding of the outer tube 8 of the body 1 on the inner tube 9. A conventional energy absorption system can be superimposed on this telescopic guiding.

The front portion 2 is rigidly linked to the frame of the vehicle with the aid of holding devices directed along an axis 26. These holding devices may be screws associated with tappings made in the frame.

It is possible to adjust the vertical position and inclination of the column in a manner known per se. Accordingly it is equipped with an adjusting device 27 pivoting around the axis 26, with a chucking pin 29 adapted for a vertical movement in a slot 28 made in the rectangular support 24, and with a locking handle 4. The chucking pin 29 is integral with the reinforcement square 35. The position of the column body 1 with respect to the frame is adjusted by blocking the vertical movement of the reinforcement square 35 fixed to the rear portion 3 in the rectangular support 24, as shown in FIGS. 2 and 4.

The brackets 5 and 6 are substantially symmetrical with respect to a vertical plane 31 containing the axis 32 of the column. They respectively have openings 15 and 16 delimited by outer edges 42 and 43 and by internal edges constituting guiding surfaces 20. These openings 15 and 16 enable units 10 and 11, known as capsules, to be inserted partly enclosing them from above and below, as can be seen in particular in FIGS. 3 and 4. These capsules 10 and 11, whose details shall be examined later, are provided with slots housing the edges of the openings 15 and 16. In one specific embodiment example, their longitudinal dimension L2 parallel to the axis 32 of the column is about 20 mm.

It is to be noted that the axis 32 of the column is not necessarily included inside the plane of the capsules 10, 11, but can be slanted inside the vertical plane 31 by the vertical adjustment device. However, as the inclination is merely a few degrees, the axis 32 is approximately parallel to the plane of the capsules 10, 11.

The outer edges 42 and 43 of the openings 15 and 16 of the brackets 5 and 6 are covered over their entire length L2 by the capsules 10 and 11, whereas the guiding surfaces 20 extend beyond the outer edges 42, 43. The openings 15 and 16 thus define guiding lengths L1 preferably being up to 100 mm.

The capsules 10 and 11 are fixed to the frame by fixing elements 12. These elements may be screws in tappings situated on the frame. The capsules are provided with windows 19 orientated parallel to the axis 32 of the column and through which the fixing elements pass 12. These windows 19 are adapted to absorb the tolerances between the brackets 5, 6 integral with the body of the column 1 and the frame.

The capsules 10, 11 are made of plastics with metallic inserts 14 inserted between the fixing elements 12 and the capsules 10, 11, as shown in FIGS. 3 and 4.

Generally speaking, the metal used for the capsules is aluminium or zamac.

The brackets 5 and 6 are adapted to slide inside the capsules 10 and 11 should an impact occur, as shown in FIG. 5.

In another mode for the possible rendering integral of the column body 1 with the frame and shown in FIG. 6, the column body 1 is fixed to a tubular element 25 by welds 33, the link being strengthened by a circular reinforcement 36. The support constituted by the tubular element 25 is then provided with two brackets 5 and 6 fixed to the frame. In this case, the column cannot be adjusted with respect to the frame as in the preceding embodiment. The structure of the brackets 5, 6 and of the capsules 10, 11 associated with them is the same as in the other Figures and shall not be mentioned in detail.

The functioning of the energy absorption device is as follows. At the moment of the impact of the driver on the steering wheel, the steering column undergoes an impact diagrammatised by the arrow E in FIG. 1. The body 1 of the column is then subjected to forces linked to the kinetics energy of the driver.

Under the thrust, the rear portion 3 of the column tends to move towards the front of the vehicle. The brackets 5, 6 to which it is linked then move with respect to the capsules 10, 11 fixed to the frame. The brackets 5, 6 thus slide into the latter, as shown in FIG. 5.

The friction and warping forces due to the forces exerted by the capsules 10, 11 on the brackets 5, 6 make it possible to absorb a portion of the energy transmitted to the column.

In the embodiment of FIGS. 1 and 5, at the level of the front portion 2 of the column, the outer tube 8 slides into the inner tube 9, this movement being adapted to be associated with known means procuring an additional energy absorption.

The total force generated by the invention is generally between 2 and 6 kN. An energy of between 200 and 600 joules is thus absorbed, which corresponds to the desired level of absorption.

The guiding surfaces 20 significantly ensure the axial guiding of the rear portion 3 of the column over a width L1 substantially greater than that L2 of the capsules 10, 11. The energy absorption can thus be effected progressively and under control whilst ensuring the axial movement of the column over its entire travel.

A preferred embodiment of the invention is shown in FIG. 7. The guiding surfaces 21 then have a variable profile in an axial direction 32 of the column. More specifically, the surfaces 21 have a variable profile from the fixing elements 12 beyond the outer edges 42, 43 limiting the openings 15, 16 of the brackets 5, 6. As shown on the drawing, the profile of the surfaces 21 regularly moves further away from the axis 32 of the column. The guiding length L1 can preferably reach 100 mm and the slope of the curve followed by the surface 21 between 10° and 30°.

The capsules 10, 11 are circular, which facilitates control of their interaction with the surfaces 21.

The openings 15, 16 of the brackets 5, 6 can be fitted with stops 22 (see FIG. 7) constituted by projecting portions transverse to the axial direction 32.

These stops 22 can be completed by return 23 visible in FIG. 8.

The slanting adjustment of the column body 1 with respect to the frame and thus to the brackets 5, 6 can be effected by an adjustment device known per se.

In the event of an impact shown schematically by the arrows E in FIG. 7, the capsules 10, 11 remain fixed to the frame by the fixing elements 12, whereas the brackets 5, 6 are propelled sliding into the capsules 10, 11 by the movement of the column body 1.

The shape of the guiding surfaces 21 then creates a progressive interaction between the brackets 5, 6 and the capsules 10, 11 as the column is displaced in its movement with respect to the frame. This interaction, either slight or none on start up, thus increases progressively. The selected profile makes it possible to obtain the desired distribution of the force during movement of the column body 1 and to have a large amount of latitude for establishing the force/travel relation.

The force exerted by a capsule 10, 11 on the corresponding bracket 5, 6 may change according to their relative movement as follows, as shown schematically on the graph of FIG. 9. The movement is expressed here in mm and the force in kN. Initially, the bracket is subjected to a significantly invariant force owing to the fact that its profile remains substantially uniform. When the capsule is freed from the outer edge 42, 43 where it encloses the bracket on both sides, the force then is slightly reduced. The increase of the slope formed by the guiding surface 21 then provokes a progressive increase of the interaction as far as the extremity of the bracket. In the case in question, the guiding length L1 is about 60 mm and the force absorbing the energy of the impact varies substantially between 3 and 6 kN.

When the column arrives at the end of travel, the stops 22 prevent it from escaping from the holding devices. The presence of returns 23 renders blocking more effective.

In particular, if an element situated on a first side of the column is damaged by the impact (stop 22, fixing element 12) the return 23 on the other side opposes the lateral movement of the column body 1 towards the first side.

The brackets 5 and 6 may be effectively embodied by drawing and cutting sheet metal elements. By way of example, a sheet steel bracket with a thickness of between 2 and 4 mm with a slope associated with guiding between 10° and 30° thus provides the sought-after force of between 4 and 6 kN.

In a third embodiment of the brackets 5, 6 shown in FIG. 10, each of the openings 15, 16 of the brackets 5, 6 comprises an internal guiding surface 20 with respect to the axis 32 of the column. As for the first embodiment of the brackets shown in FIGS. 1 to 6, the guiding surfaces 20 are rectilinear and parallel to the column axis 32. However, in this third embodiment of the brackets 5, 6, the openings 15, 16 of the brackets 5, 6 are externally bordered with respect to column axis 32 by external guiding surfaces 40 parallel to the internal guiding surfaces 20. These external guiding surfaces 40 are obtained by the fact that the outer edges 42 and 43 of the openings 15 and 16 extend over the entire length of the internal guiding surfaces 20.

Secondly, the openings 15, 16 of the brackets 5, 6 are limited towards the rear of the vehicle by stops 22 defining rear extremities 39. These stops 22 are used to stop a movement of the column body 1 after a movement equal to the guiding length L1. They also reinforce the link between the outer edges 42, 43 of the openings 15, 16 and the remaining brackets 5, 6, thus strengthening the reliability of the outer guiding surfaces 40.

In this way, the openings 15, 16 are totally surrounded by the material of the brackets 5, 6. They form elongated holes in which the capsules 10 and 11 are adapted to slide.

More specifically, each of the brackets 5, 6 is symmetrical with respect to a plane 38 parallel to the column axis 32 and perpendicular to the plane of the capsules 10, 11.

In the event of an impact shown by the arrow E in FIG. 10, the brackets 5, 6 are caused to slide into the capsules 10, 11 fixed to the frame, by the movement of the column body 1.

The force exerted by a capsule 10, 11 on the corresponding bracket 5, 6 is then substantially invariant according to their relative movement and is exclusively due to friction forces. By way of illustration, the guiding length L1 is 50 mm and the force exerted is 3 kN, as shown in FIG. 11. At the end of travel, the movement of the column body 1 is stopped with respect to the frame of the vehicle by means of the stops 22. This results in the exerted force being increased, whereas the relative movement of the capsule 10, 11 with respect to the associated bracket 5, 6 remains constant and equal to 50 mm.

In a fourth embodiment of the brackets 5, 6 shown in FIG. 12, the openings 15, 16 have internal guiding surfaces 21 with a variable profile as in the second embodiment of the brackets 5, 6 shown in FIGS. 7 and 8. Similarly as in the third embodiment, the openings 15, 16 are externally bordered by outer guiding surfaces 41 and limited towards the rear of the vehicle by stops 22. The guiding surfaces 21 and 41 are substantially rectilinear and slanted inside the plane of the capsules 10, 11 with respect to the axis 32 of the column. The internal guiding surface 21 follows a profile moving away from the axis 32 towards the rear of the vehicle, whereas the outer guiding surface 41 follows a profile approaching this axis, the inclination angles of the two profiles being opposed. Similarly as in the third embodiment, the brackets 5, 6 are symmetrical with respect to the previously defined planes of symmetry 38.

The openings 15, 16 made in the brackets 5, 6 are completed by complementary holes 45, 55 bordering them on the side of the column axis 32 and on the opposing side, respectively. These complementary holes 45, 55 appear as rectilinear slits parallel to the axis 32. They extend substantially from the centres of the openings 15, 16 to their rear extremities 39 situated towards the rear of the vehicle. The purpose of the complementary holes 45, 55 is to improve control of the deformations of the brackets 5, 6 at the time the capsules 10, 11 move into the openings 15, 16.

The force exerted by a capsule 10, 11 on the corresponding bracket 5, 6 shown schematically in FIG. 13 increases according to their relative movement. The force increases substantially linearly between 3 kN and 5 kN. When the capsules 10, 11 arrive at the stops 22, following a relative movement equal to 50 mm, the force exerted increases beyond 5 kN.

The embodiments of the brackets described earlier, far from being restrictive, give typical illustrations adapted to be used as a base for all sorts of profiles. A wide variety of shapes is in fact possible so as to obtain the desired force during the movement of the body 1 of the column.

Three other embodiments of the brackets 5, 6 shown schematically in FIGS. 14A, 14B and 14C make it possible to illustrate practically advantageous variants, but ones which are not restrictive. In these three embodiments, the brackets 5, 6 are symmetrical with respect to planes 38, being limited by stops 22 towards the rear of the vehicle and associated with the complementary holes 45, 55.

In the fifth embodiment of the brackets 5, 6 shown in FIG. 14A, the openings 15, 16 have a shape similar to that of the fourth embodiment (FIG. 12). They therefore have rectilinear guiding surfaces 21, 41 slanted with respect to the axis 32 of the column. As in the fourth embodiment, the complementary holes 45, 55 have the shape of rectilinear slits. However, in this fifth embodiment, they are slanted with respect to the axis 32 of the column. More specifically, the internal 45 and external 55 complementary holes have slopes equal to those of the internal 21 and external 41 guiding surfaces respectively. The complementary holes 45, 55 disposed immediately close to the openings 15, 16 extend beyond their rear extremities 39 towards the rear of the vehicle and beyond their mid-length towards the front of the vehicle. Their shapes thus closely follow the profiles of the guiding surfaces 21, 41, thus allowing for a precise accompaniment of the deformations of the brackets 5, 6 if an impact occurs.

In the sixth embodiment of the brackets 5, 6 shown in FIG. 14B, the openings 15, 16 are formed of an oval portion 47 extended by an elongated portion 48 appearing as a rectilinear slit parallel to the column axis 32. The rectilinear complementary holes 45, 55 extend on both sides of the elongated portion 48 of each bracket 5, 6 exceeding it at its rear 39 towards the rear of the vehicle.

In this sixth embodiment, the openings 15, 16 oppose little resistance to the sliding of the brackets 5, 6 in the oval portions 47 of the capsules 10, 11. When the capsules 10, 11 reach the entrance of the elongated portions 48, a high resistance force appears absorbing a major part of the energy due to the impact. This force remains substantially constant until the capsules 10, 11 reach the rear extremities 39 of the elongated portions 48.

According to the seventh embodiment of the brackets 5, 6 shown in FIG. 14C, the openings 15, 16 comprise, as in the sixth embodiment (FIG. 14B), a substantially oval portion 47 and an elongated portion 48. However, the oval portion 47 is larger than in the preceding embodiment and covers substantially half the guiding length L1. The oval portion 47 and the elongated portion 48 are disposed along the planes of symmetry 38 parallel to the axis 32 of the column. Complementary holes 45, 55 are disposed on both sides of the openings 15, 16 over their entire length, except for a zone situated towards the front of the vehicle. The complementary holes 45, 55, orientated in an substantially rectilinear direction and parallel to the axis 32 of the column, marry on the side of the openings 15, 16 the shapes of the internal 21 and external 41 guiding surfaces respectively.

When an impact occurs, the relative movement of the capsules 10, 11 and brackets 5, 6 has two phases. In the first, the brackets 5, 6 slide into the capsule 10, 11 through the oval portions 47 of the openings 15, 16. The force exerted by each of the capsules 10, 11 on the corresponding bracket 5, 6 is then relatively low. When the capsules 10, 11 reach the elongated portions 48, the force takes a high resistance value which enables a large part of the energy due to the impact to be absorbed. This force remains substantially constant until the capsules 10, 11 reach the rear extremities 39 of the openings 15, 16. The complementary holes 45, 55 allow for better control of the deformations of the brackets 5, 6 throughout the relative movement of the capsules 10, 11 and the brackets 5, 6.

Those skilled in the art shall understand that a large number of shapes other than those described can be embodied for the brackets 5, 6, possibly provided with stops 22, with outer guiding surfaces 40, 41 and complementary holes 45, 55 according to the desired characteristics for the controlled energy absorption if an impact occurs.

In addition to their variations inside the plane of the capsules 10, 11 with respect to the axis 32 of the column, the guiding surfaces 20, 21, 40, 41 can also have an inclination which varies with respect to the plane of the capsules 10, 11. By these means, it is possible to reinforce the interactions between the capsules 10, 11 and the brackets 5, 6.

Secondly, instead of the telescopic system 7 used for the front holding devices of the column, without departing from the scope of the invention, it is possible to use the same device as the one associated with the rear holding devices.

Although in the embodiment examples shown, the axis 32 of the column is substantially included in the plane of the capsules 10, 11, it is possible to have an angle of inclination between the two capsules without departing from the scope of the invention. In fact, in addition to the inclination due to the vertical adjustment of the column, the brackets 5, 6 and the capsules 10, 11 can be disposed in an oblique plane, provided that the latter is perpendicular to the vertical plane 31.

It is advantageous that the guiding surfaces are disposed symmetrically two by two with respect to the vertical plane 31, such as the surfaces 20, 21, 40, 41 previously described. However, non-symmetrical embodiments are also included in the scope of the present invention.

The purpose of the reference signs inserted following the technical characteristics mentioned in the claims is only to facilitate the understanding of the latter and do not limit their scope.

We claim:

1. Steering column with energy absorption device for a motor vehicle and comprising a column body (1) mounted on the frame of the vehicle by means of brackets (5, 6), said brackets (5, 6) comprising openings (15, 16) for the passage of fixing elements (12) for fixing to the frame, and capsules (10, 11) associated with at least some of said brackets (5, 6) and encompassing them, at least partially, said capsules (10, 11) being retained by said fixing elements (12), so that should an impact occur, the brackets (5, 6) integral with the column body (1) move with respect to the capsules (10, 11) fixed to the frame, the relative movement of a bracket (5, 6) with respect to the capsule (10, 11) associated with it having an effect of absorbing the energy due to the impact, said openings (15, 16) of the brackets (5, 6) comprising guiding surfaces (20, 21, 40, 41) which are disposed two by two on both sides of a vertical plane (31) containing the axis (32) of the column, and on which the capsules (10, 11) propelled by said elements (12) slide if an impact occurs, the guiding lengths (L1) of the guiding surfaces (20, 21, 40, 41) being sufficiently large so as to control movement of the column in a guiding direction substantially parallel to the axis (32) of the column, wherein said capsules (10, 11) are made of plastics and wherein a metallic insert (14) is inserted between said fixing elements (12) and said capsules (10, 11).

2. Column according to claim 1, wherein the guiding surfaces (20, 21, 40, 41) are disposed two by two, symmetrically with respect to said vertical plane (31).

3. Column according to claim 1, wherein the guiding lengths (L1) on the brackets (5, 6) extend up to 100 mm.

4. Column according to claim 1, wherein the guiding surfaces (20, 40) are substantially rectilinear and extend in a direction substantially parallel to said vertical plane (31).

5. Column according to claim 1, wherein at least some of the guiding surfaces (21, 41) have a variable profile along the axis (32) of the column, making it possible to control cooperation between said surface (21, 41) and the capsule (10, 11) sliding on it.

6. Column according to claim 5, wherein at least some of the guiding surfaces (21, 41) follow a curve varying monotonously in the direction of the associated opening (15, 16).

7. Column according to claim 6, wherein said curve followed by some of the guiding surfaces (21, 41) has a slope of between 10° and 30°.

8. Column according to claim 1, wherein at least one bracket (5, 6) is equipped with at least one stop (22) consisting of a projecting portion not parallel to the guiding direction, for preventing the column from escaping when it arrives at the end of travel.

9. Column according to claim 8, wherein said stop (22) is fitted with a return (23) consisting of a protuberance slanted with respect to said stop and substantially orientated towards the capsule (10, 11) associated with said stop (22).

10. Column according to claim 1, wherein at least some of said openings (15, 16) are bordered on both sides with respect to said vertical plane (31), with internal (20, 21) and external (40, 41) guiding surfaces.

11. Column according to claim 1, wherein some of said brackets (5, 6) comprise complementary holes (45, 55) disposed along at least one portion of the openings (15, 16), said complementary holes (45, 55) making it possible to control the deformations of said brackets (5, 6) if an impact occurs.

12. Column according to claim 1, wherein the body includes a first portion (3) situated on the driver side and a second portion (2) situated towards the front of said vehicle, and wherein said energy absorption device is provided at both the first and second portions.

13. Column according to claim 1, wherein the body includes a first portion (3) situated on the driver side and a second portion (2) situated towards the front of said vehicle, and wherein said energy absorption device is installed at the first portion and a telescopic guiding system (7) for the body (1) of the column is installed at the front.

14. Column according to claim 1, wherein the force generated by said energy absorption device is between 2000 and 6000 N.

15. Column according to claim 1, wherein it is fitted with an inflatable air bag used to distribute the force of the steering wheel on the driver.

* * * * *